United States Patent [19]

Pool

[11] 4,178,115
[45] Dec. 11, 1979

[54] VALVE SEAT RING INSTALLATION TOOL

[75] Inventor: James L. Pool, Clarinda, Iowa

[73] Assignee: Lisle Corporation, Clarinda, Iowa

[21] Appl. No.: 891,693

[22] Filed: Mar. 30, 1978

[51] Int. Cl.² .............................................. B23C 1/20
[52] U.S. Cl. ...................................... 408/82; 408/196; 408/201
[58] Field of Search ................. 408/82, 196, 197, 201, 408/223, 713; 90/12.5

[56] References Cited

U.S. PATENT DOCUMENTS

| | | | |
|---|---|---|---|
| 897,041 | 8/1908 | Weller | 408/82 |
| 2,204,855 | 6/1940 | Healy | 408/223 X |
| 3,160,066 | 12/1964 | Phillips | 408/82 X |
| 3,816,018 | 6/1974 | Hlocky | 408/713 X |

FOREIGN PATENT DOCUMENTS 2358048  5/1975  Fed. Rep. of Germany ........... 408/223

Primary Examiner—Z. R. Bilinsky
Attorney, Agent, or Firm—Allegretti, Newitt, Witcoff & McAndrews

[57] ABSTRACT

A tool for cutting or reaming a counterbore in a workpiece is guided by a pilot member secured in a bore. The tool includes a rotatable blade holder having a plurality of attached cutter blades. One of the cutter blades has a lateral cutting edge at a pre-selected radial distance from the rotational axis of the blade holder. The remaining cutter blades do not include lateral cutting edges. Consequently, the lateral or diametral dimension of the counterbore is defined by a single blade. This arrangement substantially prevents oversizing of the counterbore.

8 Claims, 4 Drawing Figures

Fig. 1
(PRIOR ART)
Fig. 2
Fig. 3
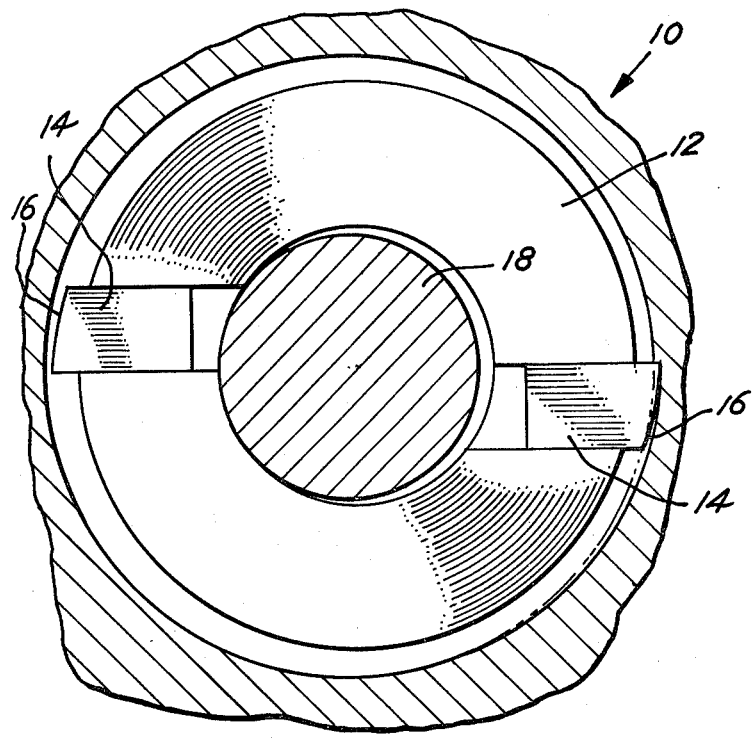
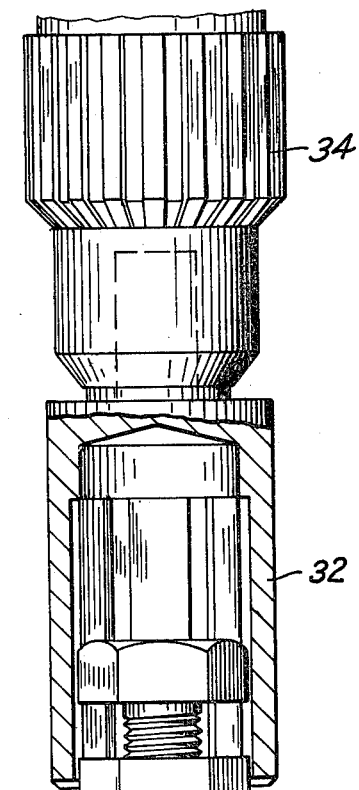
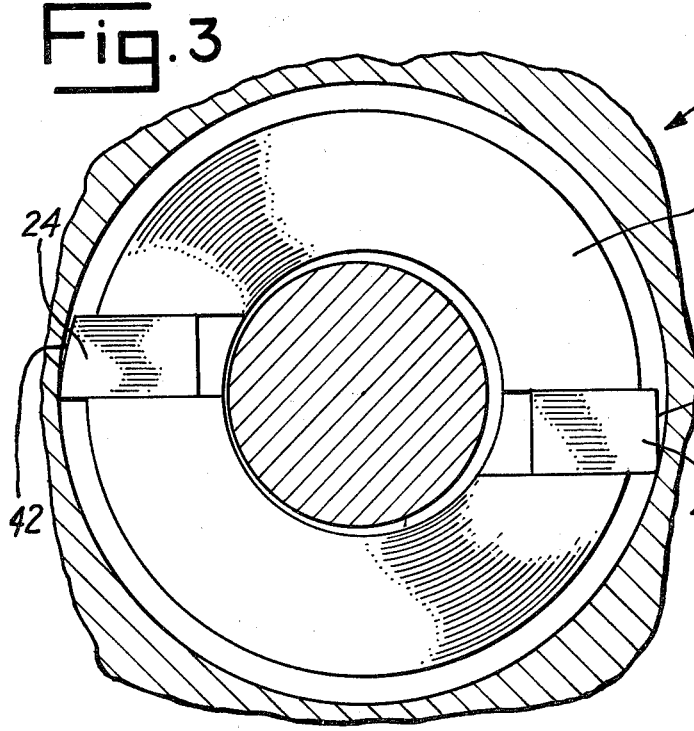
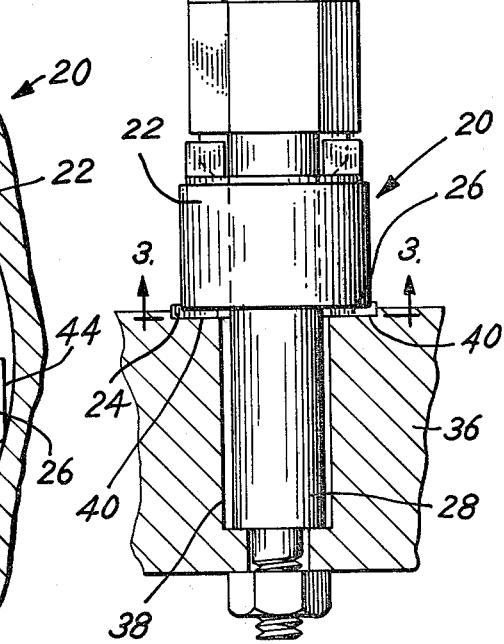

VALVE SEAT RING INSTALLATION TOOL

BACKGROUND OF THE INVENTION

This invention relates to a cutting or reaming tool and more particularly to a tool for reaming a counterbore in a workpiece of the type guided by a pilot member secured in a bore.

In the past, a variety of tools have been designed for cutting or reaming a counterbore in a workpiece. Such tools have been employed in a multitude of applications, including the reaming of a counterbore in the valve block of an internal-combustion engine for the installation of a valve seat ring. Typically, a reaming tool employed in the reaming of a valve seat ring counterbore is utilized with and guided by a pilot member or cutter pilot, and has an annular blade holder on which a plurality of cutter blades are mounted. In use, the cutter pilot, which is elongated and cylindrical, is secured at its bottom end to the underside of the valve block so that its axis is co-extensive with that of the valve bore. The reaming tool is then placed over the free end of the cutter pilot, above the location in which the counterbore is to be cut. A driving tool such as an electrically or pneumatically powered drill is then mounted on the tool and the counterbore is cut by driving the tool rotatably downward along the cutter pilot into the valve block. The cutter blades extend radially outward from the axis of the blade holder a uniform, pre-selected radial distance, and thus ideally, the counterbore is reamed to a pre-selected diameter.

While reaming tools guided by cutter pilots have been generally useful in the past, nevertheless there has remained a problem which limits their usefulness in many applications. The problem is accuracy. In the cutting of a valve seat ring counterbore, for instance, the counterbore being cut or reamed must not exceed a pre-selected diameter, and must be accurately round. If the counterbore exceeds the pre-selected diameter, or is non-circular or out-of-round, the workpiece, i.e., the valve block, may be damaged or destroyed.

In the cutting of valve seat ring counterbores it has been discovered that inaccuracies in the cutting operation result from the gradual wear of the cutter pilot and the blade holder and from deflection or bending of the cutter pilot. That is, as the cutter pilot and the blade holder wear with age, the outer diameter of the cutter pilot is reduced and the inner diameter of the blade holder is enlarged. This difference in diameter means that when a cutter blade mounted on one side of the blade holder encounters material of high hardness, due to the non-homogenity of the material of the valve block, forces acting on the cutter blade shift the blade holder away from the area of hardness and, as a result, cause the other cutter blades to gouge the sidewall of the valve seat ring counterbore being cut. This gouging also occurs when the cutter pilot flexes, and results in a counterbore which may be non-circular and enlarged beyond the desired diameter.

As a further problem the vibration or "chatter" of the cutting tool, which results from gouging during high speed operation, reduces the useful life of the cutters.

Thus, to these and other problems, the present invention is addressed.

SUMMARY OF THE INVENTION

It is thus an object of the present invention to provide an improved cutting and reaming tool that overcomes the problems of prior art tools, including the problems of inaccurate cutting and reduced cutter life.

More specifically, it is an object of the present invention to provide a tool for cutting or reaming a counterbore in a workpiece, of a type guided by a pilot member secured axially in the bore, which prevents the counterbore from becoming enlarged and non-circular because of wear of the cutter pilot and of a blade holder.

Another object of the present invention is to provide a cutting tool of the type identified which prevents the counterbore from becoming enlarged and non-circular due to flexing of the cutter pilot.

A further object of the present invention is to provide a cutting tool of the type identified which extends the useful life of the cutter blades being used.

A still further object of the present invention is to provide a cutting tool of the type described which does not require a multiplicity of precision machining operations for its construction.

Another still further object of the present invention is to provide a cutting tool of the type identified which can be produced at a mass-production cost competitive with prior art tools.

These and other objects and advantages of the present invention are satisfied by the present invention, which in a principal aspect is a tool for reaming a counterbore in a workpiece having a bore defined therein. The tool is guided by a pilot member secured in the bore and includes: a rotatable blade holder having an axis, an axial direction and radial distances being thereby defined, the axial direction parallel to said axis and the radial distances measured perpendicularly from said axis. The tool further includes a plurality of cutter blades mounted on the blade holder. One of the cutter blades has a cutting edge that extends in said axial direction, the cutting edge being located at a pre-selected radial distance from said axis. The remainder of the cutter blades each has a non-cutting edge extending in the axial direction, the non-cutting edge being located at a radial distance less than the pre-selected radial distance.

Thus, with the tool described, only one cutter blade cuts or reams the sidewall of the workpiece so that the counterbore is not enlarged in radius beyond the pre-selected radial distance due to vibration of the pilot member or wear of the pilot member and the blade holder.

In other words, when the one axial cutting edge encounters material of high hardness due to the non-homogenity of the material of the workpiece, and the blade holder is shifted away from the area of hardness, the other cutter blades, having non-cutting edges, do not gouge the sidewall of the workpiece. The tool thus cannot cut a counterbore larger than the pre-selected diameter, and any spots of non-circularity will be smoothed by further operation of the tool. In fact, with wear, the counterbores cut by a tool constructed according to the present invention become successively smaller in diameter. Since the valve seat ring is friction fitted into the counterbore, within a wide range, a smaller diameter counterbore is acceptable.

BRIEF DESCRIPTION OF THE DRAWING

The preferred embodiment of the present invention will be described with reference to the accompanying drawing wherein:

FIG. 1 is a cross-sectional view of a prior art cutting tool;

FIG. 2 is a valve seat cutting assembly which includes the preferred embodiment of the present invention; and FIG. 3 is a cross-sectional view, similar to FIG. 1, of the preferred embodiment of the present invention.

DESCRIPTION OF THE PREFERRED EMBODIMENT

Figure 4:
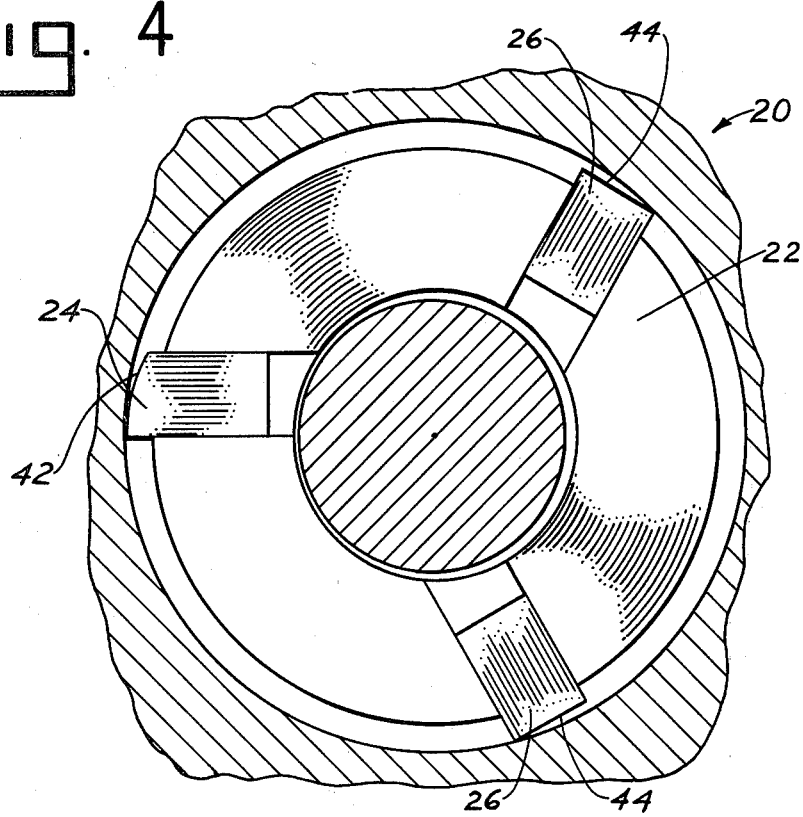
FIG. 4 is a cross sectional view of a three bladed embodiment of the present invention.

Referring to FIGS. 1-3, a preferred embodiment of the present invention is shown and generally depicted as a cutting tool 20, which will be contrasted with a prior art cutting tool 10.

As shown in FIG. 1, the prior art cutting tool 10 includes a cylindrical blade holder 12 having a plurality of cutter blades 14 mounted thereon. As depicted in FIG. 1, the longitudinal axis of the blade holder 12 is perpendicular to the plane of the figure. The cutter blades 14 are spaced at substantially equal circumferential distances about the blade holder 12, and each includes a cutting edge 16 at a uniform radial distance from the longitudinal axis of the blade holder 12.

When the blade holder 12 and a cutter pilot 18 have not been worn through use, the inner diameter of the blade holder 12 substantially equals the outer diameter of the cutter pilot 18. However, as shown in FIG. 1, the blade holder 12 and the cutter pilot 18 may become worn, with the inner diameter of the blade holder 12 increased and the outer diameter of the cutter pilot 18 reduced. As a result, a substantial difference in the size of the diameters will occur. Thus, if one cutter blade 14 encounters material of high hardness as shown to the left in FIG. 1, forces acting on the cutter blade 14 will shift the blade holder 12 away from the area of high hardness and against the cutter pilot 18. This shifting results in an increase of the depth to which the outer cutter blades 14 cut the workpiece 11 as shown to the right in FIG. 1. The cutter blades 14 thus gouge the workpiece 11, causing the counterbore to have a non-circular portion and a diameter greater than that desired.

In contrast with the prior art cutting tool 10 is the preferred embodiment 20 of the present invention. As preferred, the present invention includes a blade holder 22 having mounted thereon a plurality of cutter blades 26 and a single cutter blade 24. For cutting or reaming small counterbores, the blade holder 22 may have mounted thereon one cutter blade 24 and one cutter blade 26 which may be spaced substantially 180° about the blade holder 22 as shown in FIG. 3. However, for cutting or reaming larger counterbores, the blade holder 22 may have mounted thereon two or more cutter blades 26 in addition to a single cutter blade 24. With two cutter blades 26, the cutter blades 24, 26 may be spaced 120° about the blade holder 22.

As shown in FIG. 2, the preferred embodiment 20 is adapted to be employed as a valve seat cutting tool guided by a cutter pilot 28 and utilized in association with a driving gauge 30, a driving adapter 32 and a pneumatically or electrically powered drill 34. The preferred embodiment 20 is thus intended to be used to cut a valve seat ring counterbore in a valve block 36, for the installation of an annular valve seat ring replacement (not shown). A method of using the assembly is as follows.

First, the top of a valve guide 38 is spot faced to provide a smooth surface for the cutter pilot 28 to rest upon. The cutter pilot 28 is then inserted into the valve bore and its bottom end, which is threaded to receive a nut, is secured to the underside of the valve guide 38. The blade holder 22 is then slid down over the free, upper end of the cutter pilot 28 until it rests atop the valve block 36. The driving gauge 30 is then placed atop the blade holder 22, and the driving gauge 30 along with the blade holder 22 are driven with the driving adapter 32 and the drill 34 to cut the valve seat ring counterbore.

Referring again to FIG. 2, the cutter blades 24, 26 each include a cutting edge 40 which extends in a direction (the radial direction) perpendicular to the longitudinal axis of the blade holder 22. As show in FIG. 3, the cutter blade 24 also includes a lateral cutting edge 42 which extends in the axial or lateral direction. The cutting edge 42 is located, as measured along a radial line from the axis of the blade holder 22, at a radial distance which equals the pre-selected radius to which the valve seat ring counterbore is to be cut.

The cutter blade 26, however, has no axially extending or lateral cutting edge. Instead, the cutter blade 26 has a non-cutting edge 44, which is "foreshortened," or located at a radial distance less than that of the pre-selected radius of the valve seat and of the cutter blade 24. Thus, in contrast with the prior art cutting tool 10, the tool 20 will not cause non-circular and enlarged counterbores when the blade holder 22 is worn. Instead, when the cutter blade 24 encounters material of high hardness, the blade holder 22 will shift, without the cutter blade 26 gouging the sidewall of the valve block. Gouging will not occur because of the foreshortened, non-cutting edge 42, which is incapable of cutting.

As commercially preferred, the blade holder 22 is machined from high hardness steel and the cutter blades 24, 26 are formed of carbide or similar steel cutting material and mounted in grooves 46 machined about the circumference of the holder 22. The cutting edge 42 is slanted outward toward the rotational direction in which the tool 20 is to be driven. Foreshortening of the edge 40 by 0.005 inches has been found satisfactory.

From the foregoing, it should be apparent to those having average skill in the art that modifications and changes could be made to the cutting tool disclosed herein. Thus, the preferred embodiment of the present invention is to be considered as illustrative and not restrictive, and all cutting tools which come within the scope of the claims and are equivalent thereto should be considered as embraced therein.

What is claimed is:

1. A rotatable tool for reaming a counterbore in a workpiece having a bore with a sidewall and a bottom defined therein, said tool being of the type guided by a pilot member secured axially in said bore, said tool comprising, in combination:

a rotatable blade holder having an annular opening, the diameter of the annular opening being substantially equal to the diameter of said pilot member, and an axis defining an axial direction and radial distances, said axial direction being parallel to said axis and said radial distances being measured perpendicularly from said axis, said blade holder being annular about said axis;

a plurality of cutter blades mounted on said blade holder, one of said cutter blades having an axially extending cutting edge at a pre-selected radial distance from said axis, the remainder of said cutter blades each having a non-cutting axial edge at a radial distance less than said pre-selected radial distance, each of said cutter blades also having a radially extending cutting edge, said radially extending cutting edges being substantially equal to each other in length, and aligned in a single radial plane perpenciular to said axis;

whereby only said one cutter blade with said axially extending cutting edge reams the sidewall of the bore of said workpiece while all cutter blades ream the bottom of the bore, so that said counterbore is reamed rapidly and not enlarged in radius beyond said pre-selected radial distance due to vibration or wear of the mounting of the blade holder on said pilot member.

2. A tool as claimed in claim 1 wherein said blade holder is annular and said cutter blades are spaced at substantially equal circumferential distances about said blade holder.

3. A tool as claimed in claim 1 wherein said cutter blades are formed of steel-cutting material.

4. A tool as claimed in claim 3 wherein said steel-cutting material is carbide.

5. A tool as claimed in claim 1 including two cutter blades spaced about the circumference of said blade holder.

6. A tool as claimed in claim 5 wherein said two cutter blades are spaced substantially 180° apart.

7. A tool as claimed in claim 1 including three cutter blades spaced about the circumference of said blade holder.

8. A tool as claimed in claim 7 wherein said three cutter blades are spaced substantially 120° apart.

* * * * *